United States Patent [19]

Brown, Jr.

[11] 4,112,630
[45] Sep. 12, 1978

[54] REDUCTION OF LATERAL FORCE VARIATIONS OF A TIRE EFFECTIVE IN BOTH FORWARD AND REARWARD SENSES OF ROTATION

[75] Inventor: Jack E. Brown, Jr., Akron, Ohio

[73] Assignee: The Goodyear Tire & Rubber Company, Akron, Ohio

[21] Appl. No.: 822,770

[22] Filed: Aug. 8, 1977

[51] Int. Cl.² ............................................. B24B 1/00
[52] U.S. Cl. ............................. 51/281 R; 51/106 R; 51/165 R; 51/DIG. 33
[58] Field of Search ............ 51/281 R, 165 R, 106 R, 51/DIG. 33; 73/146

[56] References Cited
U.S. PATENT DOCUMENTS

| | | | |
|---|---|---|---|
| 3,473,422 | 10/1969 | LeBlond | 73/146 |
| 3,739,533 | 6/1973 | Fida | 51/165 R |
| 3,848,368 | 11/1974 | Toshioka | 51/165 R |
| 3,946,527 | 3/1976 | Beer | 51/281 R |
| 3,948,004 | 4/1976 | Gruber | 51/165 R |
| 4,047,338 | 9/1977 | Gormish | 51/165 R |

Primary Examiner—Harold D. Whitehead
Attorney, Agent, or Firm—R S Washburn

[57] ABSTRACT

Lateral force variations of a tire are reduced by detecting the variations in the conicity component of the lateral force with respect to the rotation angle in both forward and rearward rotational senses. The algebraic sum of the lateral force exerted by the tire parallel its own axis on a load wheel or road surface at successive angular increments of rotation in both rotational senses provide a variant signal which can be used to control grinding means to remove material from the respective tire shoulder regions in amounts and angular locations to reduce the variation of the conicity component and thus the total lateral force variation exerted by the tire in either rotational sense. The foregoing abstract is not to be taken as limiting the invention of this application, and in order to understand the full nature and extent of the technical disclosure of this application, reference must be made to the accompanying drawing and the following detailed description.

3 Claims, 5 Drawing Figures

REDUCTION OF LATERAL FORCE VARIATIONS OF A TIRE EFFECTIVE IN BOTH FORWARD AND REARWARD SENSES OF ROTATION

The present invention relates to pneumatic tires and particularly to the alleviation of dynamic irregularities in tires and provides a method particularly for alleviating lateral force variations.

It is known that pneumatic tires exert variations in force on a load surface as the tire rotates and that such variations occur both radially of the tire and parallel to the tire axis. It is also known that forces parallel to the axis, called lateral forces, vary unpredictably with respect to the radial forces. Furthermore, it is known that lateral forces exerted during one direction or sense of rotation differ from the lateral forces exerted during rotation in the opposite sense.

Divers proposals for alleviating or correcting such force variations, both lateral and radial, separately or together, are known. For example, U.S. Pat. No. 3,946,527 proposes to reduce lateral force by controlling a corrective grinding means in response to the maximum measured lateral force. U.S. Pat. No. 3,739,533 determines the mean values of lateral force variation in the two respective rotational senses, and then according to the difference between the respective mean values, grinds to uniform depth one or the other or both of the tire shoulders or axially outer ribs. U.S. Pat. No. 3,473,422 discusses measurement of the mean values of lateral force variations exerted in respectively opposite rotational senses of the tire, but does not suggest any corrective action or means. In still another example, U.S. Pat. No. 3,948,004 proposes the measurement of radial and lateral forces and, from vector sums of the respective radial and lateral instantaneous forces, the corrective grinding of material from the tire is controlled in amount and angular relation to the tire tread. It is also proposed in the patent, U.S. Pat. No. 3,948,004, that the tire being processed be rotated in first one and then the other rotational sense and that the measurements of the lateral forces be stored with a subsequent arithmetic formation of the average mean values. The stored values therein are fed to a comparator which decides whether compensation is necessary. The patent suggests removal of material over the whole tire circumference within the shoulder region. This removal results, it is said, in a shifting of the level of the zero line of the static lateral force, that is, the reference zero line of the lateral force variations represented graphically. Thus, the mean value of the lateral force variations in one rotational sense is compared to the mean value of force variation in the opposite sense and the corrective grinding is applied to the whole tire circumference at one or the other or both shoulders to reduce the absolute value of the mean difference.

The present invention, on the contrary, is predicated on the discovery that improved results can be obtained by use not of the respective mean or average values of the lateral force variations determined in the respective opposite rotational senses, but by determining for each respective increment of rotation the local instant value of the algebraic sum of the lateral forces generated by the tire in the two rotational senses. Thus, the value of the force exerted laterally is recorded for each increment of rotation relative to an arbitrarily determined zero angle and in one rotational sense, and then the value of the force exerted laterally during rotation in the opposite sense is recorded, referencing the same zero angle to associate identical increments. The variations are then compared and a signal is generated representing the variation of the conicity component of the lateral force variations for each increment of tire rotation. The so-generated signal, which varies with the angle of rotation of the tire, is then employed to control the material removal or grinding means. The grinding means then operates to remove material in angular location and amount, both being variable in response to the variant signal as a function of the angle of rotation.

Broadly but briefly, the invention comprises a method of reducing lateral force exerted by a tire, on the surface on which the tire rolls, in a direction parallel to the rotational axis of the tire which method comprises measuring the lateral force exerted while rotating the tire in one and then in the other rotational sense, computing electronically the variation in conicity as a function of the tire rotation angle from an arbitrarily fixed zero angle at each of successive increments of rotation, and grinding the tire in the shoulder region in an amount and angular location to reduce said variation.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 3:
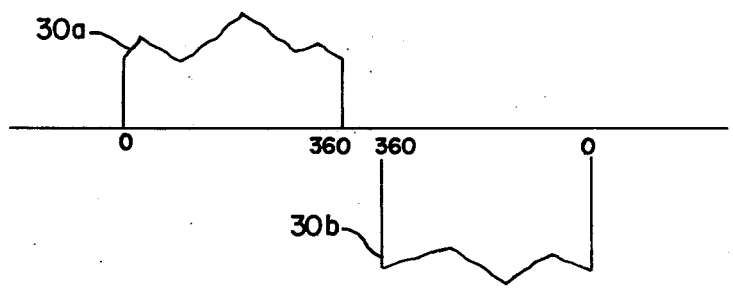
FIG. 3 is a representation of the measurement illustrated in FIG. 2 wherein the noise and unwanted higher frequencies have been removed.
Figure 4:
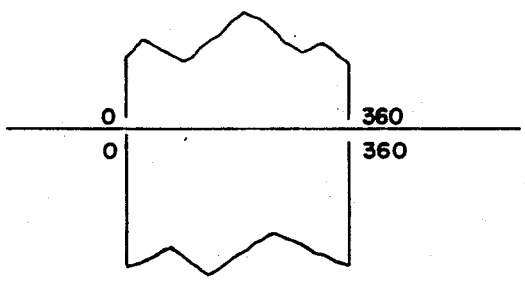
Figure 5:
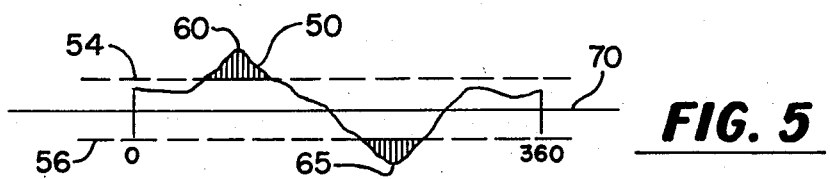

FIG. 4 illustrates the end-for-end reversal of the lower curve of FIG. 3 illustrating the incremental lateral forces of the two respective rotational senses; and FIG. 5 illustrates graphically the variant signal produced by the algebraic summation of the lateral forces exerted in each respective increment of rotation and which variant signal is employed to control grinding means for the removal of rubber from one or the other shoulder region of the tire.

Figure 1:
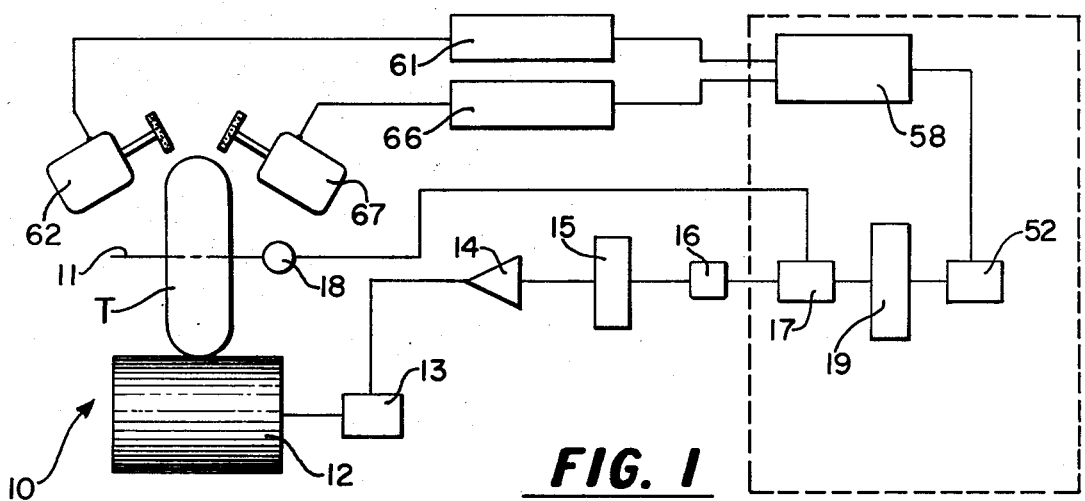
FIG. 1 is a schematic illustration of means for carrying out the invention.

When a tire is run on a force variation machine of the type generally illustrated in FIG. 1, the output of a lateral force load sensor can be shown on a chart (FIG. 2) of total lateral force plotted against a rotation angle. It is known that a plot 20a of total lateral force versus angle of rotation in a first rotation sense will differ from a similar plot 20b of the lateral force versus rotation when the tire direction of rotation is in the opposite sense. Each of the lateral force plots, however, will show a variation with respect to a mean lateral force 22a, 22b.

Heretofore, such curves have been analyzed and/or treated as though they were two steady state levels, one at each of the mean measured lateral forces.

Ply steer PS and conicity C are commonly defined in the art as relatively independent components of the total lateral force TLF steady state levels. Ply steer force is dependent in direction on the direction of rotation, which is to say that the direction of the component known as ply steer changes direction when the direction of rotation of the tire is reversed, while on the other hand, the component known as conicity does not change direction and is independent of the sense of rotation of the tire.

Thus,
$TLF_1 = C + PS$
$TLF_2 = C - PS$

These equations may be solved for conicity and ply steer:

$C = (TLF_1 + TLF_2)/2$ $PS = (TLF_1 - TLF_2)/2$

I have found that this concept may be carried further by considering ply steer and conicity to have also variations. Thus, considering a representative increment of rotation, a tire can be considered to have a ply steer and a conicity component:

$TLF_1 = F_1\text{(average)} + Y_1$ and $TLF_2 = F_2\text{(average)} + Y_2$ $$\text{Then } C = \frac{TLF_1 + TLF_2}{2} = \frac{[F_1\text{(average)} + F_2\text{(average)}]}{2} + \frac{[Y_1 + Y_2]}{2} \quad \text{(EQ 1)}$$

$$PS = \frac{TLF_1 - TLF_2}{2} = \frac{[F_1\text{(average)} - F_2\text{(average)}]}{2} + \frac{[Y_1 - Y_2]}{2} \quad \text{(EQ 2)}$$

wherein
$F_1$ is the mean or average value of the lateral force in rotation sense 1, and wherein
$F_2$ is the mean or average value of the lateral force in rotation sense 2.

The first term on the right of the equations (EQ 1, EQ 2) are those previously mentioned as the steady state values of conicity and of ply steer. The second terms in the respective equations are the variations from the respective mean values of conicity and ply steer, respectively. Thus, it is shown that the ply steer and conicity variation can each be calculated from the two lateral force variation curves.

In accordance with the present invention, it is the second term in the equations given, as distinguished from the heretofore employed first term in each of the respective equations, which is used to control the grinding or other material removal means so as to relieve or alleviate the dynamic non-uniformity, particularly the variation of the conicity component.

I have discovered that the lateral force variation curve also may change the shape of its wave form and the peak-to-peak magnitude of the lateral force variation from one to the other tire rotation sense and that by use of conventional computer logic that the variations of the respective lateral forces from their respective mean values can be employed to improve the tire with respect to the dynamic lateral forces exerted by the tire on the surface on which it rolls. I have also found that methods for alleviating the lateral force variations which have heretofore been proposed often reduce the lateral force variation exerted in one rotation sense of the tire while the lateral force variation exerted by opposite rotation of the tire is not improved and is often made worse.

By way of example, at a particular increment of the circumference of the tire a ply steer component and a conicity component are additive. When the direction of tire rotation is reversed, the ply steer component changes direction but the conicity component remains unchanged in axial direction. It will be assumed, therefore, that the lateral force exerted by a tire at any selected increment of its circumference is the algebraic sum of the ply steer and conicity components measured for that particular increment of tire rotation in the two respective rotational senses.

The method in accordance with the present invention then is to effect a reduction of the lateral force variation in both directions of rotation by grinding or otherwise removing rubber from the shoulder regions at least at the high and low extremes of the conicity variation. I have found that when the amount of the conicity variation only is reduced or eliminated, the average lateral force variation taken in both directions is reduced.

In operation, the present method employs a conventional force variation machine 10 having a fixed axis 11. The tire T to be tested and ground to reduce lateral force variation is mounted for rotation about the axis 11 and inflated. The load roll 12, which provides the surface on which the tire rolls, is urged against the tire to provide a predetermined base load on the tire. As the tire is rotated, variations in the lateral force exerted by the tire T on the roll 12 are detected in the load cell or detector 13. The variations in load produce a variant signal, as suggested in FIG. 2, which is amplified 14, filtered 15, and converted 16, from an analog signal to a signal in digital form which goes to a storage device 17. The rotation angle, with respect to an arbitrarily selected zero, of the tire is coded in digital form by the shaft encoder 18 whose output goes also to the storage device 17. After rotation of the tire in the first rotational sense, the signal pattern held in the storage device 17, can be visualized as the curve 30a of FIG. 3.

The tire rotation sense is then reversed. This could be done by dismounting and remounting the tire itself with its sidewalls reversed, i.e. left to right and right to left as seen in FIG. 1; however, it is preferred to reverse the direction of rotation of the tire without dismounting the tire.

Figure 2:
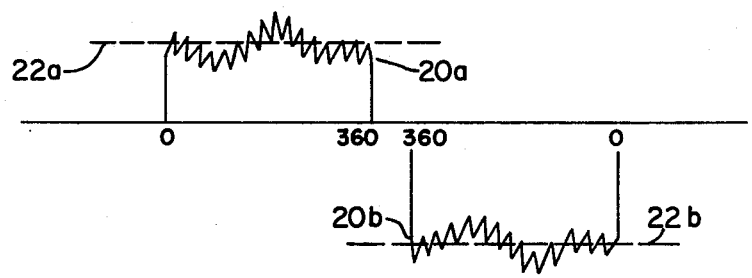
FIG. 2 is a representation of the respective lateral force variations exerted by a tire measured in the respective opposite rotation senses.

The tire, now rotating in the opposite sense but otherwise with the same load applied by the roll 12, exerts a differing pattern of lateral force variation, as suggested by the curve 20b, FIG. 1, and when filtered, as in 30b, FIG. 2. As before, the digitized signal goes to the storage device 17.

The computer 19 is programmed suitably to select from the storage device for each increment of tire circumference the value (ordinate) of the force measured in each of the two respective rotation senses and to combine each pair of the so-selected values to produce their summed values, that is, the values of the conicity variation, $Y_1 + Y_2/2$ of each rotational increment. The values so calculated from each successive increment of the circumference of the tire, form a variant signal 50 as represented in FIG. 5.

This variant signal goes then to the comparator 52. Predetermined limits, which define the tolerance for the tire, are supplied also to the comparator. The residual signal, that is, that part of the curve 50 above the limit line 54 or below the limit line 56 goes to the control logic unit 58 in which values of the residual signal, as in the peak region 60, are routed to the servo-controller 61 which actuates the tire shoulder grinder 62 and the values of the residual signal, as in the peak region 65, are routed to the servo-controller 66 which actuates the other shoulder grinder 67. The tire grinders 62,67 are thereby operated to reduce the variation in the conicity component with respect to a mean value, as indicated by the line 70 of the variant signal 50.

What is claimed is:

1. Method of reducing lateral force exerted by a tire, on the surface on which the tire rolls, in a direction parallel to the rotational axis of the tire, which method comprises determining for each successive increment of circumference of the tire the summation of the lateral force of such increment measured while the tire rotates in a first rotational sense and the lateral force of such increment measured while the tire is rotated in the opposite rotational sense, generating a variant signal proportional to said summation of said successive increments of circumference, and grinding the tire to reduce the variation of said signal from its mean value thereby effecting a reduction in the total lateral force variations in the tire.

2. Method of reducing variations in force exerted by a tire in loaded rolling engagement with a load wheel or road surface, said method comprising rotating the tire and wheel in one rotational sense, detecting variations in force exerted parallel to the axis of the tire in successive circumferential increments, registering in a memory device the variations so detected during at least one revolution of the tire, rotating the tire and wheel in the other rotational sense, detecting variations in force exerted parallel to the axis of the tire in successive increments of the circumference of the tire, determining the algebraic sum of the variations detected during the respectively opposite rotations and at corresponding increments of the circumference of the tire to provide a variant signal, actuating grinding means to remove material from the tire in response to the variant signal.

3. A method of reducing lateral force exerted by a tire on the surface on which the tire rolls in a direction parallel to the rotational axis of the tire, which method comprises measuring the lateral force exerted while rotating the tire successively in each rotational sense, computing electronically the variation in conicity as a function of the tire rotation angle from an arbitrarily fixed zero angle at each successive increment of rotation, and grinding the tire in amount and angular location to reduce said variation.

* * * * *